(12) United States Patent
Prouvost et al.

(10) Patent No.: US 11,731,742 B2
(45) Date of Patent: Aug. 22, 2023

(54) FLOATING SOLAR PLANT

(71) Applicant: CIEL ET TERRE INTERNATIONAL, Sainghin en Melantois (FR)

(72) Inventors: Stéphane Prouvost, Sainghin en Melantois (FR); Benjamin Le Blan, Sainghin en Melantois (FR)

(73) Assignee: CIEL ET TERRE INTERNATIONAL, Sainghin en Melantois (FR)

( * ) Notice: Subject to any disclaimer, the term of this patent is extended or adjusted under 35 U.S.C. 154(b) by 0 days.

(21) Appl. No.: 17/921,431

(22) PCT Filed: Apr. 15, 2021

(86) PCT No.: PCT/HR2021/050663
§ 371 (c)(1),
(2) Date: Oct. 26, 2022

(87) PCT Pub. No.: WO2021/219948
PCT Pub. Date: Nov. 4, 2021

(65) Prior Publication Data
US 2023/0182872 A1   Jun. 15, 2023

(30) Foreign Application Priority Data

Apr. 28, 2020 (FR) ...................................... 2004233

(51) Int. Cl.
*B63B 35/44* (2006.01)
*H02S 30/10* (2014.01)
(Continued)

(52) U.S. Cl.
CPC .............. *B63B 35/44* (2013.01); *B63B 75/00* (2020.01); *B63B 81/00* (2020.01); *H02S 30/10* (2014.12);
(Continued)

(58) Field of Classification Search
CPC .............. B63B 35/44; B63B 2035/442; B63B 2035/4453; B63B 75/00; B63B 81/00; B63B 2241/08; H02S 30/10
See application file for complete search history.

(56) References Cited

U.S. PATENT DOCUMENTS

2008/0029148 A1   2/2008  Thompson
2012/0279557 A1*  11/2012  Alwitt ..................... F24S 20/70
                                                    136/251
(Continued)

FOREIGN PATENT DOCUMENTS

DE    102010026790 A1   1/2012
WO      2012003961 A1   1/2012
(Continued)

OTHER PUBLICATIONS

International Search Report dated Jul. 2, 2021 in corresponding International Application No. PCT/FR2021/050663; 6 pages.
(Continued)

*Primary Examiner* — Stephen P Avila
(74) *Attorney, Agent, or Firm* — Maier & Maier, PLLC

(57) ABSTRACT

A floating solar plant supporting photovoltaic panels, resulting from the assembly of structural modules and floating modules on a body of water, forming a network of floating support devices supporting photovoltaic panels. The network including at least: a first row of floating support devices supporting a first row of photovoltaic panels, a second row of floating support devices supporting a second row of photovoltaic panels, and wherein the first row of photovoltaic panels and the second row of photovoltaic panels are spaced apart according to the transverse direction, perpendicular to the longitudinal direction by structural modules, and wherein at least the structural modules ensuring the spacing between the first row of photovoltaic panels and the second row of photovoltaic panels are configured so as to be immersed, at least during the passage of a servicing unit.

19 Claims, 8 Drawing Sheets

(51) Int. Cl.
  *B63B 75/00* (2020.01)
  *B63B 81/00* (2020.01)
(52) U.S. Cl.
  CPC . *B63B 2035/442* (2013.01); *B63B 2035/4453* (2013.01); *B63B 2241/08* (2013.01)

(56) References Cited

U.S. PATENT DOCUMENTS

| | | |
|---|---|---|
| 2017/0033732 A1 | 2/2017 | Kim |
| 2018/0001975 A1 | 1/2018 | Jaramillo |

FOREIGN PATENT DOCUMENTS

| | | |
|---|---|---|
| WO | 2012013998 A1 | 2/2012 |
| WO | 2014136106 A1 | 9/2014 |
| WO | 2014136107 A1 | 9/2014 |
| WO | 2015092237 A1 | 6/2015 |
| WO | 2016100995 A1 | 6/2016 |
| WO | 2019053389 A1 | 3/2019 |

OTHER PUBLICATIONS

First Examination Report dated Dec. 29, 2022, in corresponding Indian Application No. 202117042800, 7 pages.
Written Opinion dated Jul. 2, 2021 in corresponding International Application No. PCT/FR2021/050663; 11 pages.

\* cited by examiner

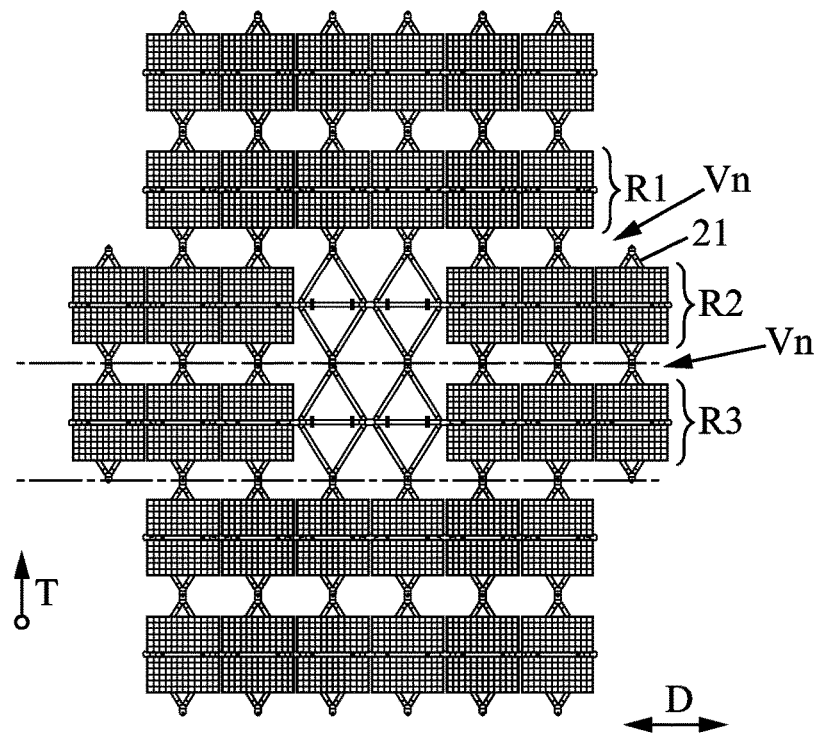
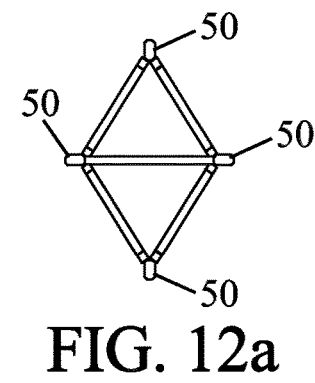
FIG. 12  FIG. 12a
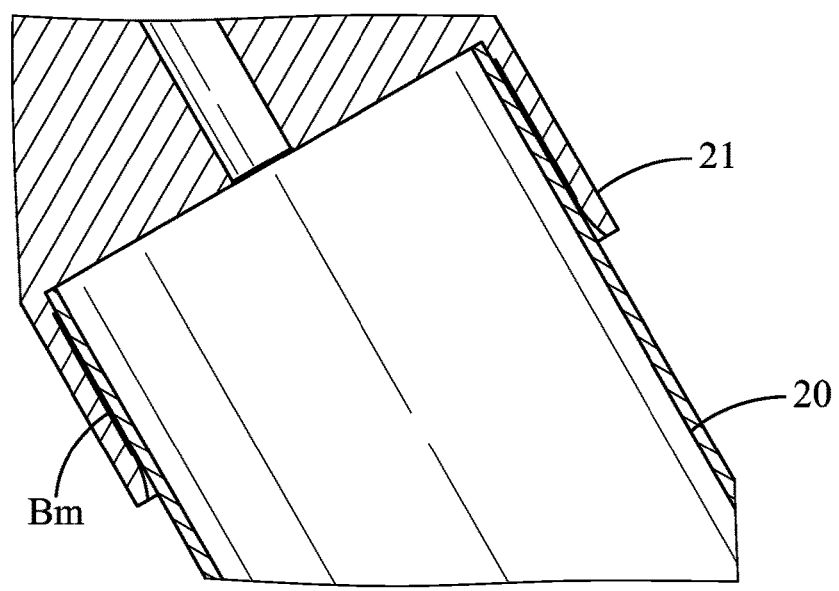
FIG. 13

FLOATING SOLAR PLANT

The invention relates to a floating solar plant with a modular design. The invention also relates to a method for manufacturing such a plant, a method for assembling such a plant, as well as a method for maintaining such a plant.

FIELD

The present disclosure covers solar plants with a modular design in particular those forming a floating network, supporting photovoltaic panels, and more particularly those with large dimensions.

BACKGROUND

Such plants with a modular design, are known for example from the document WO201213998 (A2), or WO 2015092237(A1) of the present Applicant. These technologies enable the design of photovoltaic plants with large dimensions, ranging from a few hundreds of kilowatts to several tens of megawatts, and even more.

In both cases, the modular components of the plant according to WO 201213998 (A2), WO 2015092237(A1) essentially consist of plastic components, obtained by moulding, easily at a controlled cost. Because of the modular design, the floating devices supporting photovoltaic panels advantageously have limited weight and bulk, configured so as to be assembled from the edge of the bank, without any particular lifting tool such as a crane for putting them in the water, the network of floating support devices being typically pushed on the water, by manpower, progressively with the assembly thereof.

Noteworthily, and according to the observations of the Applicant, the floatability of such plants is sized not only to take up the vertical load of the components composing it, but also to take up the load of one or several man/men, moving over the network in order to carry out the maintenance of the plant. Thus, and as they are designed and operated nowadays, these plants conventionally have maintenance corridors for the operators between the different rows of photovoltaic panels.

According to the observation of the Applicant, the design of such solar plants with a modular design does not allow reducing the material cost as it requires, for the proper conduct of maintenance, oversizing the floatability of the solar plant in comparison with what would have been strictly necessary from a physical perspective to take up the vertical load of the photovoltaic panels, and possibly the inverters and electrical cables, and of the components that compose the floating solar plant.

The document US2017/0033732A1 describes such an aforementioned modular state of the art, and criticises their excessive sensitivity to rolling, pitching, yawing, which sensitivity would be due, according to this prior art, to the fact that the structures are mechanically linked to one another above the water.

The solution proposed by this document US2017/0033732A1 comprises pairs of anchor lines, each connected to a dead weight on the bottom and to a buoy at its other end, ensuring tensioning of an intermediate connecting element, completely immersed, in the form of a tensioned cable extending below the water level, in a generally horizontal manner.

Each of the photovoltaic panel floating support devices comprises a self-supporting framework, on which a plurality of floats is secured, at the front and rear portions of the device.

This framework extends:
  at the upper portion of the floats to ensure the support and inclination of the panel
  at the lower portion of the floats for supporting an immersed wing, intended to limit the pitching and rolling movements.

Hooks are provided at the bottom portion of the framework, to enable fastening of the floating support devices to the tensioned cable, which extends in a generally horizontal manner, immersed under the frameworks of different floating support devices.

Thus, such a design allows limiting the sensitivity of the floating support devices to rolling, pitching, yawing by a cable kept tensioned, extending in an immersed and horizontal manner, and fastened at the bottom portion of the floating support devices supporting the panel, to hooks at the lower portion of the framework of the devices.

The maintenance of the panels is carried out by boat, which could be temporarily bound to the floating support devices by means of rods removably attached on attachment brackets of the floating support device.

The floating solar plant according to US2017/0033732A1 has a structure configured so as to work only in tension, along the direction of tensioned cables and is based on keeping the floating support devices tensioned by this structure, including said tensioning cables, substantially horizontal, immersed and fastened to hooks at the lower portion of the frameworks of the devices. This requires tensioning each cable by both ends thereof to dead weights. According to the observations of the inventors, this structure with tensioned cables is particularly difficult to implement, and does not allow maintaining a large number of floating support devices of photovoltaic panels. In particular and unlike the aforementioned modular plants, it is not possible to assemble the network of floats from the bank, ashore, and in both directions of the space, and then push the structure progressively with the assembly on the ground because it cannot resist compression, along the direction of the cables.

It is also known from the document US2018/001975 A1 to form a floating solar plant with a modular design comprising floating support devices each comprising a float, a mechanical means for fastening a photovoltaic panel on the float.

Noteworthily, spacers with a U-channel like shape allow linking two rows of floating devices supporting panels, each spacer being immersed so as to create a waterway throughout the U-shaped spacers. A maintenance platform, with a small draught, allows ensuring maintenance of the solar plant, when the floats of the maintenance platform circulate along the waterways.

Thus, the structure of the network of this plant comprises said base floats supporting the photovoltaic panels, which extend, for the largest part, above the water level, and the U-channel like shaped spacers, such a floating structure being anchored to the bottom by the edges of the network, typically by dead weights. Noteworthily, this structure must withstand the compressive and tensile forces, generated in response to the conditions of the environment, such as the swell or the wind. According to the observations of the inventors, the structural strength, and the sensitivity to deformation under stress (upon a tensile or compressive force) of such a structure is poor, in particular because of the U-like shaped spacers which will obviously tend to deform, in particular to easily bend, when these spacers are loaded in compression or in tension, unless additional floating mechanical links are provided, as described in paragraph 46 and illustrated in FIGS. 13A and 13B of the prior art US2018/0001975. Such an additional link is provided slidably at its ends at two vertical webs of the U, and is constrained in the top position by the flotation of the link. It can be immersed in the stowed position, low to enable the passage of a float of a maintenance platform.

As shown in FIG. 12 of this prior art US2018/0001975 A1, the structure ensuring the transmission of the forces of the network not only comprises the floats of the floating devices supporting the panels, substantially at the water level (non-immersed for the largest part) and the U-channel like shaped connections (immersed for the largest part). In other words, such a network structure according to US2018/0001975 A1 alternately extends, above the water surface with its floats, and then below the floats, with the U connections, and so on.

According to the observations of the Applicant, because of this structure, it becomes difficult to assemble the network of floats from the bank and in both directions of the space, and then push the structure progressively with the assembly from the bank because it includes the U connections which protrude under the floats which then cannot rest on the ground, and because the protruding connections would generate considerable frictions resisting putting in the water by mere slipping on the ground.

A floating solar plant is also known from document WO 2014/136106, comprising a lattice of flexible ropes tensioned, within a peripheral, rigid, possibly articulated, structure, the flexible ropes of the lattice extending generally horizontally, above the water level. The flexible ropes form a plurality of polygonal cells having nodes at the vertices thereof. A plurality of independent floating solar modules are arranged in the cells and directly or indirectly fastened to the nodes.

Some of the nodes have U- or V-like shaped rigid connections, partially immersed, enabling the creation of a waterway between two rows of modules. The tensioned ropes are coupled to the ends of the U, above the water, while the middle portion of the U is immersed. The created waterways enable the circulation of a maintenance unit comprising two hulls and a bridge.

According to the observations of the inventors, and like the document US2017/0033732A1, WO 2014/136106 requires for the implementation thereof tensioning of ropes, and more particularly the formation of a lattice of flexible ropes, necessarily with a tensioning on a peripheral structure. According to the observations of the inventor, such a lattice of tensioned ropes is particularly difficult to implement.

Like the document US2018/0001975 A1, WO 2014/136106 uses, for the creation of the waterways, U connections that do not extend in the horizontal plane of the lattice of ropes, but below the plane of the lattice of ropes to form the waterways. The (tensile) forces of the structure are alternately distributed, in the horizontal plane of the lattice of ropes, and then in the Us, below the horizontal plane, and therefore not contained in the horizontal plane, which is not ideal in terms of force transmission. Like the document US2018/0001975 A1, the use of partially immersed U connections for the creation of the waterways is not ideal because such U connections are too sensitive to deformation in the horizontal plane, and according to the observations of the inventors.

SUMMARY

The invention is intended to address this situation.

More particularly, the object of the present invention is to propose a plant, whose modular design allows assembling said plant easily and rapidly, from the bank, and in particular, in a non-limited manner, without requiring lifting means for putting it in the water, and whose design allows carrying out maintenance, without requiring oversizing of the floatability of the plant, in particular in comparison with the plants known for example from the document WO201213998 (A2) or from the document WO 2015092237(A1) wherein the implementation of maintenance requires the floatability of the plant to take into account the take-up of the load of one or several operator(s) performing the maintenance.

More particularly, at least according to one embodiment, the object of the present invention is to propose a plant, whose modular design allows carrying out maintenance, with the creation of waterways in photovoltaic panels, and with a design such that it enables a quick assembly of these modules, while being strong, and merely sensitive to deformation, under swell and wind conditions, with an improved network structure in comparison with that disclosed by the document US2018/0001975 A1.

Another object of the present invention is to propose, at least according to one embodiment, such a plant wherein the modules composing it can, in the disassembled state, be easily transported and stored, in particular thanks to their weight and their limited bulk.

Another object of the present invention is to propose a plant provided with a servicing module specifically designed for the implementation of maintenance.

Other objects and advantages will appear from the following description which is provided for indicative purposes and which is not intended to limit it.

Also, the present disclosure relates to a floating solar plant supporting photovoltaic panels, resulting from the assembly of structural modules and floating modules on a body of water, forming a floating network supporting photovoltaic panels, including:

a first row of photovoltaic panels,
a second row of photovoltaic panels,
and wherein the first row of photovoltaic panels and the second row of photovoltaic panels extend along the same longitudinal direction and are spaced apart according to the transverse direction, perpendicular to the longitudinal direction, and wherein at least said structural modules ensure spacing between the first row of photovoltaic panels and the second row of photovoltaic panels are configured so as to be immersed, enabling the circulation of a floating servicing unit along a waterway above said structural modules said structure of the network, resulting from the assembly of said structural modules, rigid or semi-rigid, being configured so as to work along the two directions substantially of the horizontal plane of the structure while resisting the compressive forces and the tensile forces to which said structure of the network is subjected.

According to the present disclosure, the structure of the network extends substantially along the horizontal plane, the structure may comprise said assembly of the structural modules forming a lattice of beams with a polygonal meshing extending along the horizontal plane, the beams of the lattice replicating the polygonal pattern of the meshing, featuring apertures configured to cool down the photovoltaic panels located above the structure of the network, the lattice of beams being configured so as to be immersed on place, or alternatively immersed at least locally under the vertical load of the servicing unit and wherein vertical supports are subjected to the structural modules in particular secured to the beams of the lattice, and possibly to the floating modules, to ensure the vertical interlocking of the photovoltaic panels with respect to the horizontal plane forming the structure of the network such that the compressive/tensile forces transit in the structural modules, while being contained in said horizontal plane of said structure of the network. Preferably, the structure of the network has a planar seat, said structure of the network being configured so as to be substantially planar when it rests on a planar surface.

For example, the lattice may have a triangular meshing, or have a lozenge-shaped meshing, or a hexagonal (honeycomb) meshing. The lattice may be complete, or incomplete, some of the beams being absent, preferably regularly.

The beams of the lattice may consist of "long" beams, meaning that the beams have a larger dimension than the polygonal pattern of the meshing (in particular than the sides of the pattern, for example triangular), or "short" beams, with a dimension corresponding to the lengths of the sides of the polygon of the polygonal pattern of the meshing of the lattice.

In the case where "short" beams are used, fittings may be used to link the beams belonging to the same structural module, the beams then being set end-to-end at the vertices of the polygonal pattern. These fittings may, at least for some of them, have flexible protruding ears, enabling the assembly of the structural modules to one another to form the lattice of the structure. These flexible protruding ears may enable the lattice structure to deform off the horizontal plane formed by the structural, in particular at the vertices of the polygon of the patterns, in particular under the vertical load of the servicing unit.

In the case where the beams of the lattice consist of "long" beams, meaning that the beams have a larger dimension than the polygonal (in particular triangular) pattern of the meshing, it could be possible, at least according to one embodiment, to obtain a local sinking of the structure by sizing of the beams, which could then bend under the vertical load of the operator (or of the maintenance unit) so that the structure locally sinks in the water at the level of the vertical load, and then the portion of the lattice structure remote from the load remains outside the water.

The structure of the network, which extends along the horizontal plane, may bear on the horizontal surface, directly in particular through the beams of the lattice, or via the floating modules, in particular in the case where these are distinct from the structural modules.

According to one embodiment, the floatability of the solar plant is configured so that the structure of the network, formed by the lattice of beams with a polygonal meshing (extending along the horizontal plane) is completely immersed on place with the presence of a water height above the structural modules so as to form a waterway between the first row of photovoltaic panels and the second row of photovoltaic panels, extend along the longitudinal direction. To this end, the structural modules extending along the horizontal plane may be arranged below the floating modules, in order to keep the network structure (namely the lattice with a polygonal meshing) completely immersed on place. In any case, the photovoltaic panels PV of the plant are kept out of water by the vertical supports which extend from the beams of the lattice with a polygonal meshing, and possibly the floating modules.

According to another possibility, the floatability of the plant is configured such that:
the structure of the network, formed by the lattice of beams with a polygonal meshing extending along the horizontal plane is above the water when the structure of the network is not subjected to any (substantial) vertical load other than that of the photovoltaic panels,
said structural modules are immersed, at least locally, under the vertical load of a servicing unit vertically bearing on the structure of the network, the photovoltaic panels of the plant being kept out of water by the vertical supports upon a local sinking by the servicing unit.

According to this embodiment, the floatability of the plant is preferably insufficient for an operator, whether a man or a women, weighting between 60 kg and 150 kg could walk on the beams of the structure of the lattice without having his/her feet in the water because of the local sinking of the structure. In other words, when an operator weighting between 60 kg and 150 kg walks on the structure of the network (namely the lattice with a polygonal meshing), the latter sinks in the water and the operator then has his/her feet in the water.

According to an advantageous embodiment, the structure of the network resulting from the assembly of the structural modules forms a lattice with a polygonal meshing and in particular with a triangular meshing, in particular equilateral or isosceles, a lozenge-shaped or hexagonal (honeycomb-like shaped) meshing.

According to one embodiment, the structure of the network results from the assembly of self-supporting floating support devices, each (or at least most of them) supporting a photovoltaic panel, and possibly a plurality of photovoltaic panels, such as two panels or three, said floating support devices comprising said structural modules, each structural module of the floating support devices supporting the photovoltaic panel, and possibly the plurality of photovoltaic panels.

In particular, the structural module of each floating support device extends beyond the photovoltaic panel, along the transverse direction, so as to create the waterway between the first row of photovoltaic panels and the second row of the photovoltaic panels.

According to one embodiment, the structural module of each floating support device consists of a pattern of the lattice with a polygonal meshing, forming a polygon, for example a triangle in particular isosceles or equilateral or a lozenge, linking means ensuring fastening of the structural modules of the floating support devices to one another, in particular by the vertices of the polygonal patterns of the meshing.

According to one embodiment, the structural module includes tubes, respectively forming the sides of the polygon of the polygonal pattern, the tubes being assembled together by fittings at the vertices of the polygon. The fittings form deflections and may be tubular too.

According to one embodiment, the linking means ensuring fastening of the structural modules of the devices to one another including ears protruding from the fittings, several ears being set opposite one another and crossed by a locking member to ensure fastening between said floating support devices.

In particular, the tubes may form several envelopes tightly enclosing air, or are filled with a material having a density lower than water. Sealing may be obtained by tight welding between the fittings and the tubes, in particular in the case where the tubes are filled with air.

In particular, it may consist of an induction weld, obtained by subjecting a metallised ring, provided as an intermediary between an inner/outer bearing surface of the fitting and an outer/inner bearing surface of the tube, to an electromagnetic radiation, both the tube and the fitting being made of a plastic material. When subjected to the electromagnetic radiation, the metallised ring is heated up to a temperature higher than the melting point of the plastic of the fitting and of the tube, causing welding thereof between the plastic of the fitting and that of the tube. Preferably, the ring is apertured, for example evenly perforated or wire-netted, to promote the close contact of the plastic of the outer/inner bearing surface of the tube with the plastic of the inner/outer bearing surface of the fitting throughout the perforations.

According to one embodiment, the structure of the network (namely the lattice with a polygonal meshing) is above the water, not completely immersed on place, under the load of the photovoltaic panels, and is configured so as to be immersed temporarily, and locally under the vertical load of the maintenance unit, by deformation of the flexible ears.

According to one embodiment, all or part of the locking members crossing the ears are secured to the floating modules positioned above the structure of the network formed by the assembly of structural modules in order to keep the structure of the network (the lattice with a polygonal meshing) immersed on place.

According to one embodiment, the polygonal pattern of the lattice is a polygon with N sides, N distinct structural modules being assembled by their ends respectively forming the sides of the polygon of the lattice with a polygonal pattern. the structural modules (namely the "short" beams) may be assembled by ears at their ends set opposite one another and crossed by locking members.

According to one embodiment, the floating modules are subjected to all or part of the structural modules, these not being floatable as such. For example, the structure of the network resulting from the assembly of the structural modules is not floatable as such, the floatability of the plant being ensured by said floating modules provided as elements distinct from the structural modules, and wherein the photovoltaic panels, at least of the first row of photovoltaic panels and/or of the second row of panels, are secured to the floating modules, via the vertical supports directly linking the photovoltaic panels and the floating module.

According to another possibility, the structural modules combine a floating module function, and could thus be formed by the same elements, namely by the tubular beams, and possibly the fittings, which could tightly enclose an air volume or contain a material having a density lower than water.

According to the present disclosure, the vertical supports are subjected to the structural modules (or to the floating modules) to ensure the vertical interlocking of the photovoltaic panels with respect to the horizontal plane forming the structure of the network. For example, the structural modules and the vertical supports are assembled by a hooking rib/hooking groove pair. In the case where the beams of the lattice consist of tubes, the tubes may typically be obtained by extrusion, possibly with the obtainment of the hooking rib/hooking groove during the extrusion, by an extrusion die featuring the outline of the rib/groove.

According to one embodiment, the beams of the lattice consist of tubes whose length corresponds to the sides of the polygonal pattern of the lattice and assembled together by fittings at the vertices of the polygonal pattern.

In particular, the floating modules may be formed by the tubes of the structural modules which form tight envelopes tightly enclosing air, possibly with their fitting or are filled with a material having a density lower than water.

According to one embodiment, the plant comprises a third row of photovoltaic panels, following the first and second rows of photovoltaic panels, and wherein each of the second row of photovoltaic panels and the third row of photovoltaic panels extends along the same longitudinal direction and are spaced apart according to the transverse direction, perpendicular to the longitudinal direction by the structural modules and wherein said structural modules ensuring spacing between the second row of photovoltaic panels and the third row of photovoltaic panels are configured so as to be immersed forming a waterway along the longitudinal direction between the second row of photovoltaic panels and the third row of photovoltaic panels enabling the circulation of a floating servicing unit, the structural modules extending substantially along the horizontal plane such that the compressive/tensile forces transit in the structure, while being contained in said horizontal plane of said structure of the network.

According to one embodiment, said plant is equipped with a floating servicing unit U, configured so as to circulate along the waterway between the first row of photovoltaic panels and the second row of photovoltaic panels.

the servicing unit may comprise:
   a first hull and a second hull spaced apart according to the spacing between the two waterways respectively separating the first row of photovoltaic panels and the second row of photovoltaic panels on the one hand, and the second row of photovoltaic panels and the third row of photovoltaic panels, on the other hand, the first hull being configured so as to circulate in the waterway between the first row of photovoltaic panels and the second row of photovoltaic panels, the second hull configured so as to circulate in the waterway between the second row of photovoltaic panels and the third row of photovoltaic panels
   a bridge, joining the first hull and the second hull to one another, and configured so as to lie astride the photovoltaic panels of the second row of photovoltaic panels when the servicing unit circulates according to the longitudinal direction.

According to one embodiment, the bridge comprises a window.

According to one embodiment, the floating unit is configured so as to circulate along the waterway above the structural modules interlocked between the first row of photovoltaic panels and the second row of photovoltaic panels, and possibly along the waterway above the structural modules interlocked between the second row of photovoltaic panels and the third row of photovoltaic panels, while causing the local sinking of the structure of the network, by bearing on said structural modules, in particular by bearing on the beams of the lattice with a polygonal meshing.

According to one embodiment, all or part of the floating modules and of the structural modules consist of metallic, plastic or composite elements obtained by moulding or extrusion, or result from the assembly of metallic, composite or plastic elements obtained by moulding or extrusion.

The present disclosure also relates to a method for manufacturing the structural modules of a plant according to the present disclosure, wherein the structural modules forming polygonal patterns of the lattice with a polygonal meshing of the structure of the network are obtained by assembling the plastic tubes, with a length corresponding to the sides of the polygonal pattern of the lattice with a polygonal meshing, the tubes being set end-to-end by plastic tubular fittings at the vertices of the polygonal patterns and assembled by tight welding between inner/outer bearing surfaces of the fittings and outer/inner bearing surfaces of the tubes to respectively form the structural modules.

The weld consists of an induction weld may be obtained by subjecting a metallised ring, preferably apertured, provided as an intermediary between an inner/outer bearing surface of the fitting and an outer/inner bearing surface of the tube, to an electromagnetic radiation.

The present disclosure also relates to a method for assembling a plant according to the present disclosure, wherein the structural modules, obtained by the method for manufacturing structural modules, are assembled by setting ears protruding from the fittings opposite one another, several ears being set opposite one another and crossed by a locking member of the structural modules at the vertices of the polygonal patterns of the lattice of the structure of the network.

The present disclosure also relates to a method for assembling a plant according to the present disclosure, wherein the structural modules, the floating modules and the photovoltaic panels are assembled together on the bank of the body of water, while pushing the structure of the network supporting the photovoltaic panels progressively with the assembly thereof.

The present disclosure also relates to a method for maintaining a plant according to the present disclosure with a servicing unit, wherein the maintenance of the plant is ensured thanks to the servicing unit circulating in the waterway(s) between the photovoltaic panels.

BRIEF DESCRIPTION OF THE DRAWINGS

Other features, details and advantages will appear upon reading the detailed description hereinafter, and upon analysing the appended drawings, wherein:

FIG. 1 is a perspective view of a floating solar plant wherein the structure of the network forms a lattice with a triangular mesh, resulting from the assembly of the structural modules of floating support devices, each supporting a photovoltaic panel, each structural module forming a triangular pattern of the lattice, the floating support devices being assembled together by the vertices of the triangle of each triangular pattern, the tubes of the structural modules ensuring the floatability of the plant, the structural modules forming the floating modules, the floatability of the plant being configured so that the structural modules are above the water when subjected to the load of the photovoltaic panels, and configured so as to sink at least locally under the vertical load of a floating servicing unit while forming at least one waterway between the first row of photovoltaic panels and the second row of photovoltaic panels, and possibly a waterway between the second row of panels, and a third row of photovoltaic panels, and possibly more generally for a plant with an integer number of N rows of photovoltaic panels, a waterway between the row of rank k and k+1 when k is comprised between 2 and N−1.

FIG. 2 is a bottom view of FIG. 1 illustrating the lattice with a triangular mesh, resulting from the assembly of the structural modules and along a substantially horizontal plane.

FIG. 3 is a detail view illustrating fastening between the vertices of the structural modules of the floating support devices of the plant of FIG. 1.

FIG. 4 is a detail view of a floating support device of the plant according to FIG. 1.

FIG. 4a

FIG. 4a is a detail view of the hooking rib/hooking groove pair ensuring fastening between the vertical support and a tube of the structural module.

FIG. 5 is a detail view of the tube forming a triangular side of the structural module, which could be obtained by extrusion, including with its hooking rib.

FIG. 6 is a view of the solar floating plant, including the servicing unit comprising a first hull configured so as to circulate in the waterway between the first row of photovoltaic panels and the second row of photovoltaic panels above the structural modules, and a second hull configured so as to circulate in the waterway between the second row of photovoltaic panels and the third row of photovoltaic panels above the structural modules, as well as a bridge joining the first hull and the second hull to one another, and configured so as to lie astride the photovoltaic panels of the second row of photovoltaic panels when the servicing unit circulates according to the longitudinal direction.

FIG. 7 is a view of a floating solar plant according to one embodiment, differing from that of FIG. 1 in that the structure of the network, extending along the horizontal plane, formed by the triangular structural modules is completely immersed on place, the floatability of the plant being ensured by means of floating modules, located above the structure of the network, secured to the locking members, crossing the ears of fittings of the structural modules to ensure fastening of the floating support devices to one another.

FIG. 8 is a perspective view of a solar floating plant according to a third embodiment, wherein the structure of the network has a triangular meshing, each triangular pattern of the meshing being formed by three structural modules assembled by their ends with ears of the structural modules, set opposite one another and crossed by locking members.

FIG. 9 is a schematic view of a solar floating plant according to a fourth embodiment, wherein the structure of the network has a triangular meshing, resulting from the assembly of long beams, and according to another possible orientation of the rows of photovoltaic panels with respect to the triangular patterns of the network.

FIG. 10 is a schematic view of a floating solar plant according to a fifth embodiment, wherein the structure of the network has a triangular meshing, resulting from the assembly of long beams, and according to still another possible orientation of the rows of photovoltaic panels with respect to the triangular patterns of the network.

FIG. 11 is a schematic view of a floating solar plant according to a sixth embodiment, wherein the structure of the network consists of a lattice with a triangular meshing, resulting from the assembly of beams forming the sides of the triangular pattern, the structure of the network itself not being floatable, the floatability of the plant being ensured by floating modules, secured to the lattice, in particular embedded with the lattice, each floating module having in particular grooves, in particular cross-like shaped, where the beams of the lattice extend longitudinally, the photovoltaic panels of the different rows of floats being secured to the floating modules, via vertical supports.

FIG. 12

FIG. 12 is a perspective view of a floating solar plant wherein the structure of the network forms a lattice with a lozenge-shaped mesh, resulting from the assembly of the structural modules of floating support devices, each supporting a photovoltaic panel, each structural module forming a lozenge-shaped pattern of the lattice, the floating support devices being assembled together by the vertices of the lozenge of each lozenge-shaped pattern, the tubes of the structural modules ensuring the floatability of the plant, the structural modules forming the floating modules, the floatability of the plant being configured so that the structural modules are above the water when subjected to the load of the photovoltaic panels, and configured so as to sink at least locally under the vertical load of a floating servicing unit while forming at least one waterway between the first row of photovoltaic panels (which is a double row) and the second row of photovoltaic panels (which is a double row), and possibly a waterway between the second row of panels, and a third row of photovoltaic panels (which is a double row), and possibly more generally for a plant with an integer number of N rows of photovoltaic panels, a waterway between the row of rank k and k+1 when k is comprised between 2 and N−1.

FIG. 12a

FIG. 12a is a schematic view of the structural module forming a lozenge-shaped pattern of a floating support device, configured so as to support two panels ("duo pitch").

FIG. 13

FIG. 13 is a sectional view, according to a plane passing through the axis of the tube, illustrating the weld between the outer bearing surface of a tube, and the inner bearing surface of a fitting, via an intermediate metallised ring, configured for the implementation of an induction welding between the plastic of the inner bearing surface and of the outer bearing surface.

FIG. 14 is a sectional view, according to a vertical sectional plane, of a fitting of a structural module of a plant, the fitting being made of plastic comprising a tubular body forming a deflection by 60° (for the particular case of an equilateral triangle), including a first inner bearing surface provided with a first metallised ring, fitted and overmoulded, the inner bearing surface intended for receiving an outer bearing surface of a first tube, as well as a second inner bearing surface provided with a second metallised ring, fitted and overmoulded, intended for receiving an outer bearing surface of a second tube, inclined by 60° with respect to the first tube, the metallised rings—first metallised ring and second metallised ring—being perforated and configured so as to ensure melting of the plastic of the inner bearing surface of the fitting and of the outer bearing surface of the tube, throughout the perforations of the rings.

DETAILED DESCRIPTION

Figure 1:
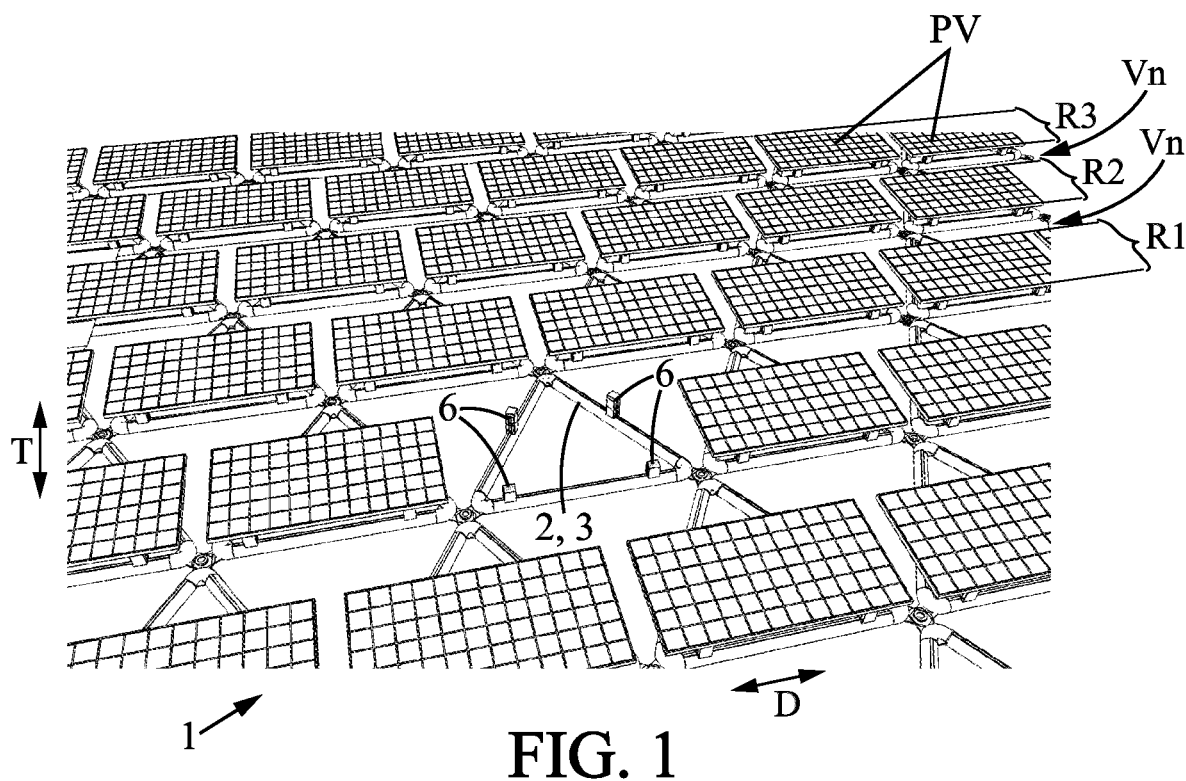
FIG. 1
Figure 2:
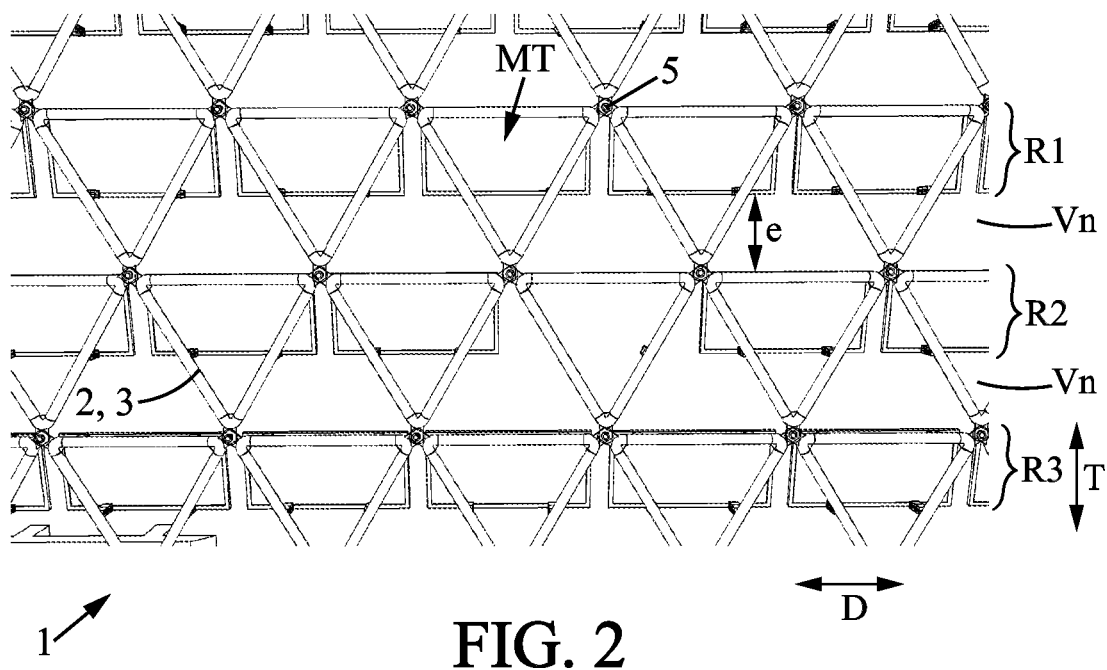
FIG. 2
Figure 3:
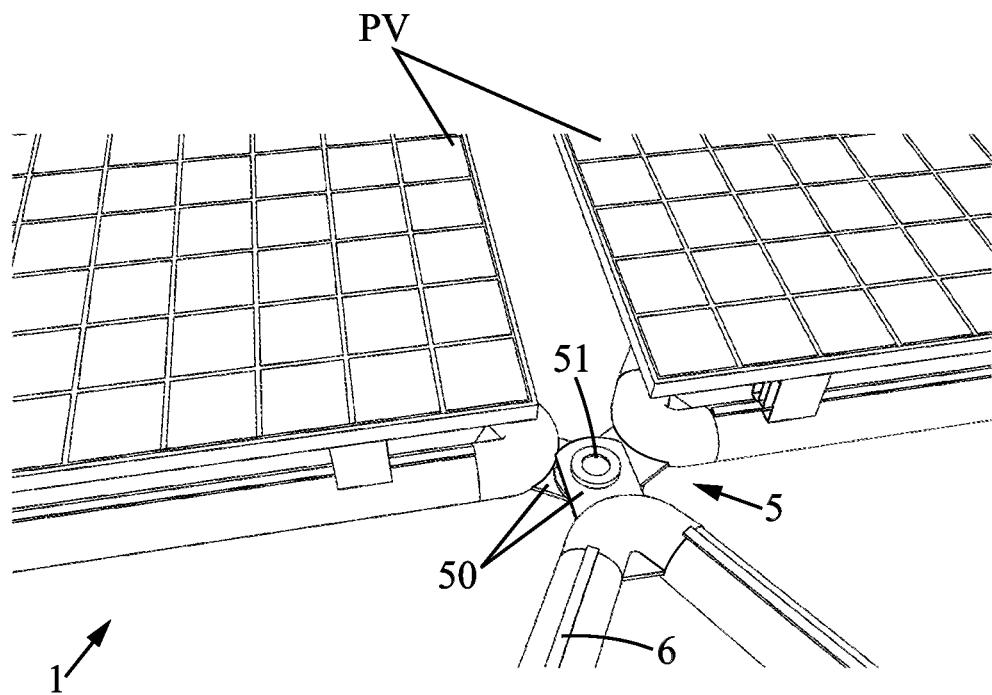
FIG. 3
Figure 4:
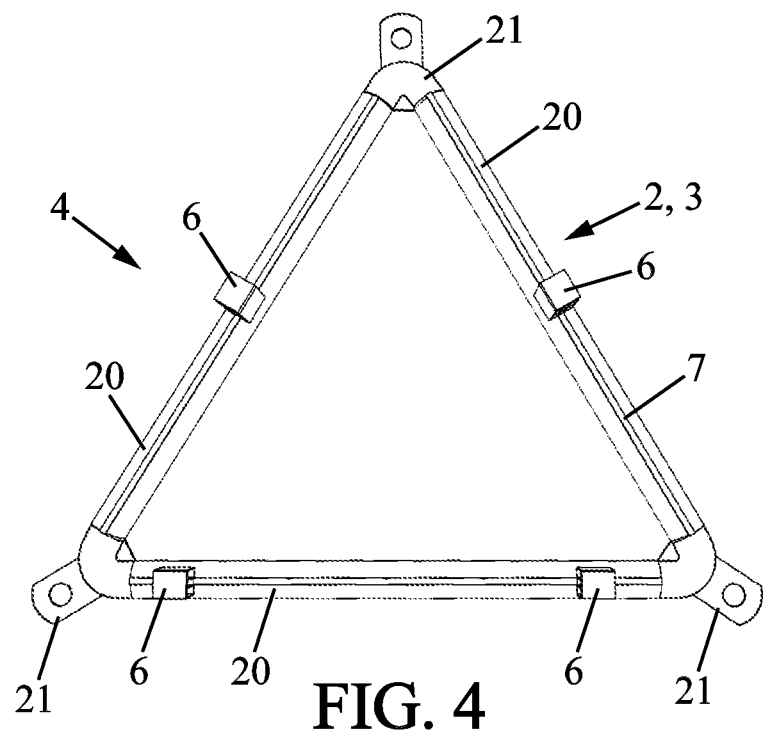
FIG. 4
Figure 4A:
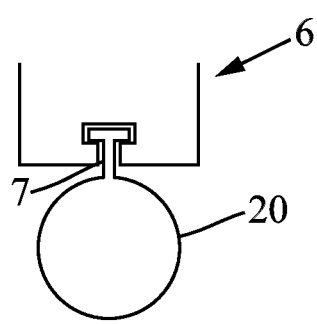
Figure 5:
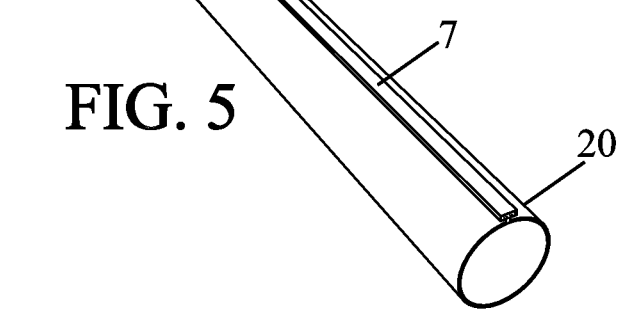
FIG. 5

The drawings and the description hereinafter essentially contain certain elements. Hence, they could not only be used to better understand the present disclosure, but also contribute, where appropriate, to the definition thereof.

The present disclosure relates to a floating solar plant 1 supporting photovoltaic panels PV, results from the assembly of structural modules 2; 2' and floating modules 3; 3' on a body of water, forming a floating network supporting photovoltaic panels, including:

a first row R1 of photovoltaic panels,
a second row R2 of photovoltaic panels, and wherein the first row R1 of photovoltaic panels and the second row R2 of photovoltaic panels extend along the same longitudinal direction D and are spaced apart according to the transverse direction T, perpendicular to the longitudinal direction.

According to the present disclosure, at least said structural modules 2 ensure the spacing between the first row R1 of photovoltaic panels and the second row R2 of photovoltaic panels and are configured so as to be immersed, at least locally and/or temporarily, enabling the circulation of a floating servicing unit U along a waterway Vn above said structural modules 2.

According to the present disclosure, said structure of the network, results from the assembly of said structural modules 2, rigid or semi-rigid, said structure being configured so as to work along the two (non-parallel) directions substantially of the horizontal plane of the structure while resisting the compressive forces and the tensile forces to which said structure of the network is subjected.

According to the present disclosure, the structure of the network extends substantially along the horizontal plane such that the compressive/tensile forces transit in the structural modules 2, while being contained in said horizontal plane of said structure of the network.

Noteworthily, at least according to one embodiment, the structure of the network has a planar seat, said structure of the network being configured so as to be substantially planar when it rests on a planar surface.

According to the present disclosure, the structure of the network resulting from the assembly of the structural modules 2 forms a lattice with a polygonal meshing. This lattice with a polygonal meshing extends substantially along the horizontal plane of the structure of the network.

The structure of the network, may be anchored to the bottom (or to the bank) by means of anchor lines, linking said structure of the network to dead weights, or to piles.

According to one embodiment, the floatability of the solar plant 1 is configured so that the structure of the network, extending along the horizontal plane is completely immersed on place with the presence of a water height above the structural modules 2 so as to form a waterway between the first row R1 of photovoltaic panels and the second row R2 of photovoltaic panels, extend along the longitudinal direction D. Such an embodiment is illustrated for indicative purposes in FIG. 7. Benefiting from a network structure completely immersed on place advantageously allows filtering at least part of the UV rays, and possibly smoothing the temperature variations to which the structure of the network is subjected, in comparison with a network structure whose structural modules are in open air.

To this end, the structural modules 2 extending along the horizontal plane are arranged below the floating modules 3, in order to keep the structure of the network completely immersed on place.

Alternatively, the floatability of the plant is configured such that the structure of the network extending along the horizontal plane is configured so as to be above the water when the structure of the network is not subjected to any substantial vertical load other than that of the photovoltaic panels, and possibly of the electrical lines.

Moreover, and in such a case, the floatability of the plant is configured such that said structural modules 2 are immersed, at least locally, temporarily under the vertical load of a servicing unit U bearing vertically on the structure of the network. According to this other possibility, the waterway Vn between the first row R1 of photovoltaic panels and the second row R2 of photovoltaic panels, with a water height above the structural modules is ensured only by sinking of the structure of the network by the servicing unit U.

Moreover, and noteworthily, the floatability of the plant might be insufficient for an operator, whether a man or woman, weighting between 60 kg and 150 kg could walk on the beams of the structure of the lattice without having his/her feet in the water because of the local sinking of the structure. In other words, and when the operator walks on the beams of the lattice, these sink locally, the operator then having his/her feet in the water.

This local sinking may result from the sizing of the beams, which bend under the vertical load of the operator (or of the maintenance unit) for the structure to locally sinks in the water at the level of the vertical load, and then the portion of the lattice structure remote from the load remains outside the water. Such an embodiment is particularly suitable when the beams of the lattice are "long" beams, for example according to FIGS. 9 and 10, namely the beams have a larger dimension than the polygonal (in particular triangular) pattern of the meshing.

This local sinking may also result from the fact that the structure of the lattice has flexible areas, in particular at the level of the vertices of the polygon of the meshing.

Figure 11:
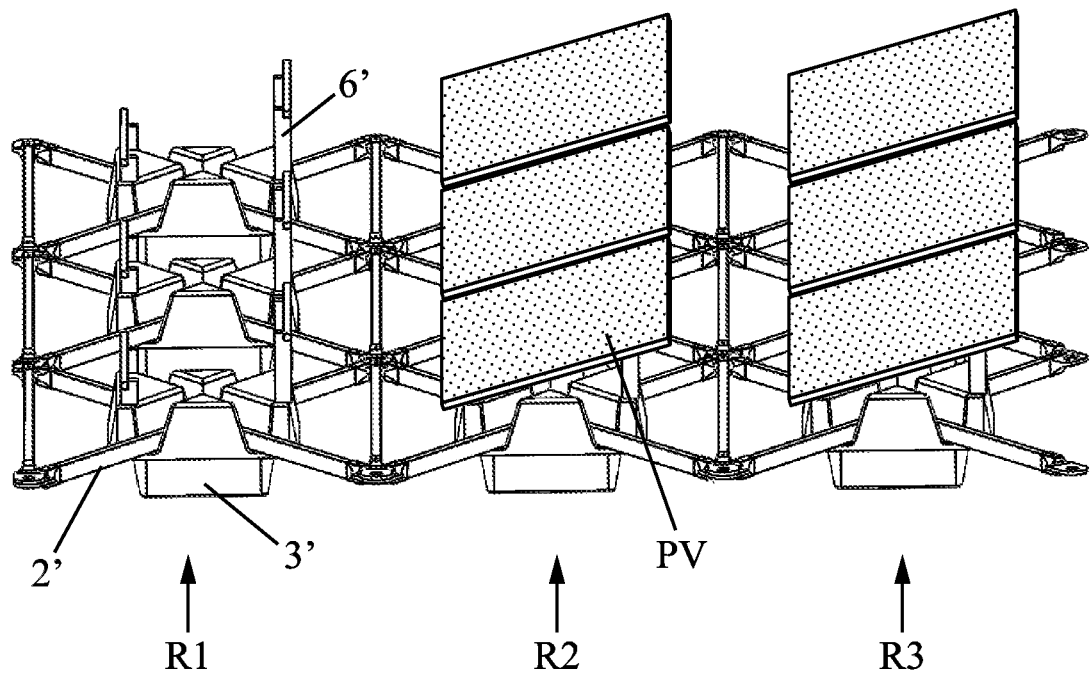
FIG. 11

In any case, and even when the structure of the network is pushed down by the maintenance unit, the photovoltaic panels PV of the solar plant are kept outside the water, in particular via vertical supports 6, linking the structural modules 2, 2' to the photovoltaic panels, or in particular via vertical supports 6' linking the photovoltaic panels PV to the floating modules 3' (when these are provided as element distinct from the structural modules), and as illustrated as example in FIG. 11.

Figure 7:
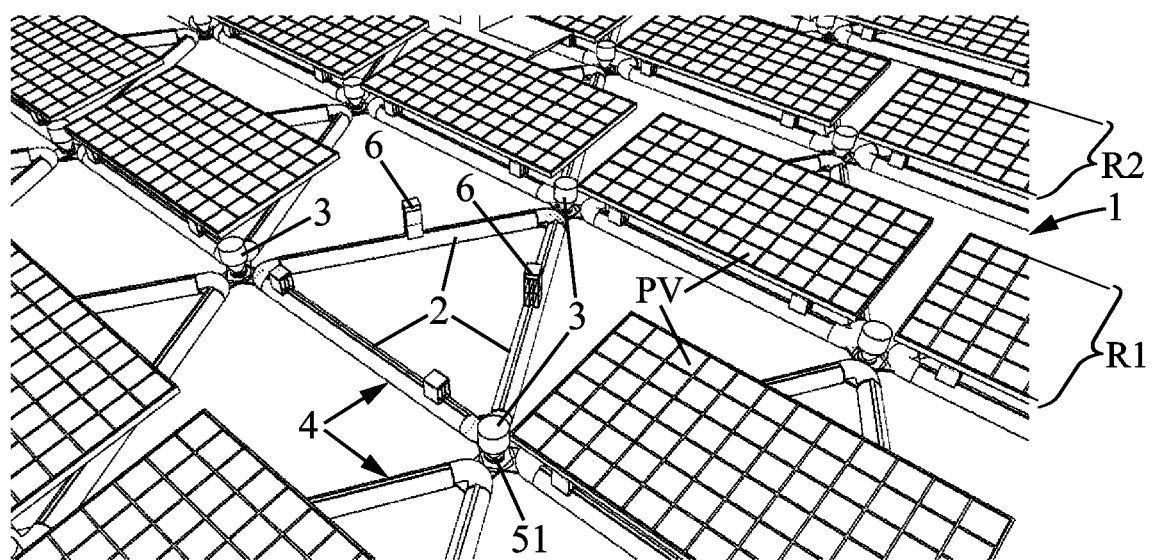
FIG. 7
Figure 8:
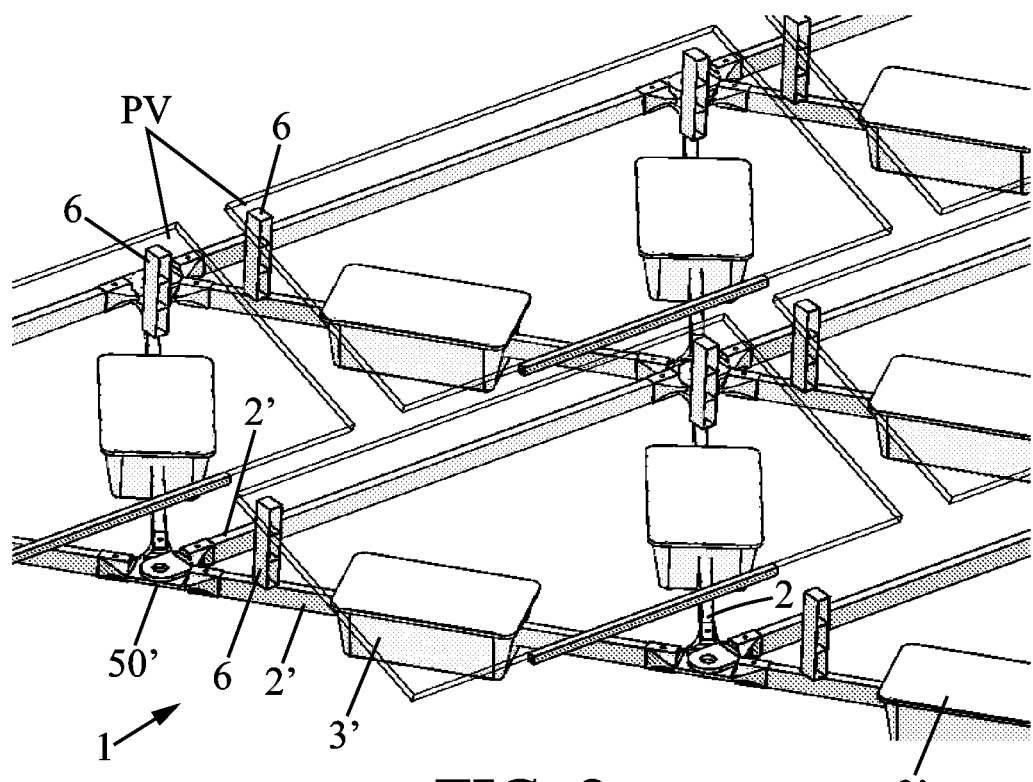
FIG. 8
Figure 9:
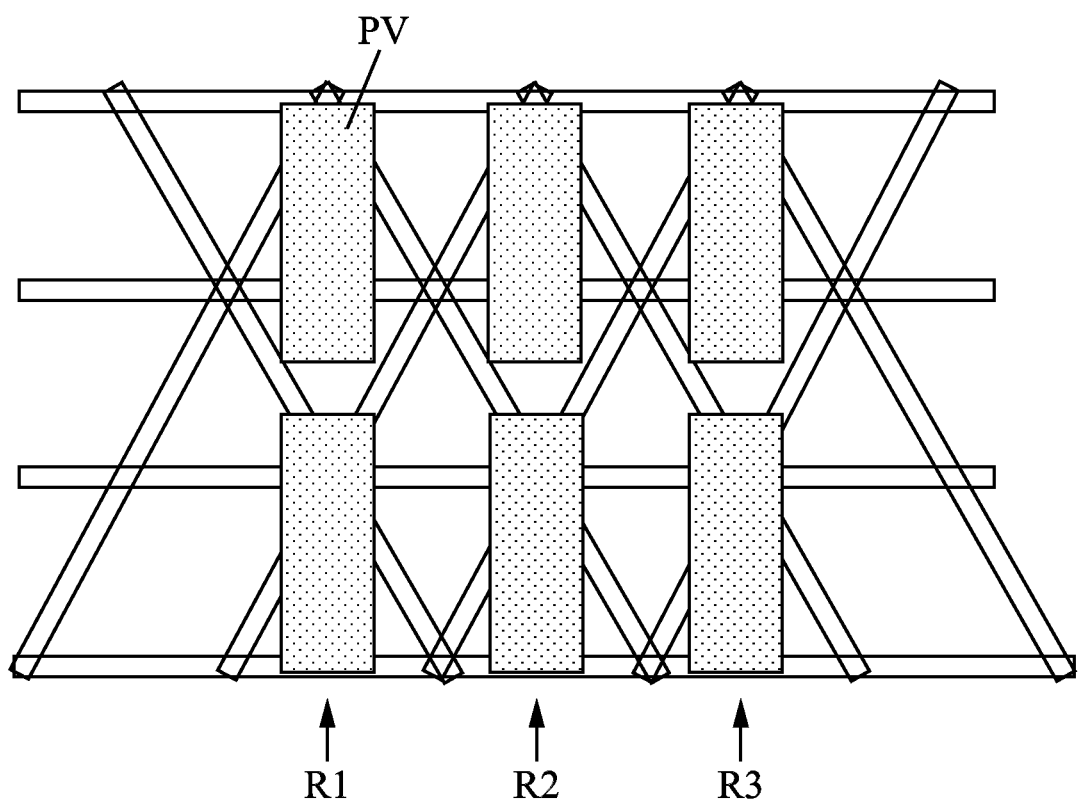
FIG. 9
Figure 10:
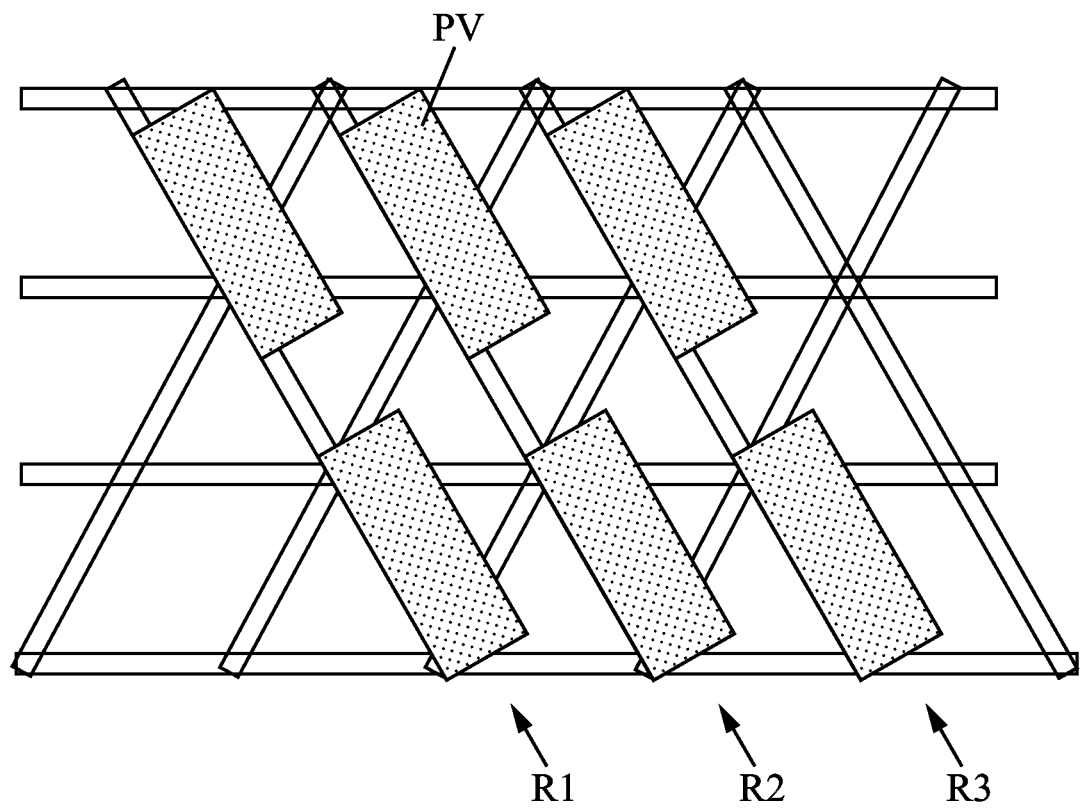
FIG. 10

The beams of the lattice may consist of "long" beams meaning, for example, the beams have a larger dimension than the polygonal (in particular triangular) pattern of the meshing for example according to FIGS. 9 and 10, or "short" beams, in particular in the form of tubes, with a dimension corresponding to the length of one side of the polygon of the pattern of the meshes of the lattice, for example according to the examples of FIGS. 1 to 7, 8 and 12.

When "short" beams are used, fittings 21 are used to link the beams to the hopper at the vertices of the polygonal pattern. These fittings 21 include at least two inner (or alternatively outer) bearing surfaces cooperating with outer (or alternatively inner) bearing surfaces belonging to two consecutive beams of the polygonal pattern. These fittings may also bear ears 50. Thus, these ears 50 could enable the lattice structure to deform, in particular at the vertices of the polygonal pattern.

The pattern of the meshing may consist of a polygon, in particular a regular, or irregular, polygon. The polygon may consist of a rectangle, in particular a square, a lozenge, or a triangle in particular an isosceles or equilateral triangle, or a (hexagonal) honeycomb pattern. The lattice may be complete (without any absent beam), or incomplete as illustrated in FIG. 12. FIGS. 1 to 8 illustrate several embodiments for which the lattice has a triangular meshing, the polygon consisting of a triangle, in particular equilateral or isosceles. FIG. 12 illustrates a lattice with a lozenge-shaped meshing, with a floating support device having a structural module forming a lozenge-shaped pattern. A reinforcing beam may join two opposite vertices of the lozenge as illustrated in FIG. 12*a*.

Notice that the beams of the lattice replicating the polygonal pattern of the meshing, feature (empty) apertures, in particular with substantial sizes, which could allow reducing the weight of the structure, and possibly effectively cooling the photovoltaic panels located above the structure of the network, in particular by air convection phenomena between the water and the photovoltaic panels, and even when the structural modules are not immersed on place under the weight of the photovoltaic panels.

The different rows of panels (first row R1, second row R2, third row R3) may be carried, by the consecutive rows of the different polygonal patterns. The dimension of the polygonal patterns according to the transverse direction T is oversized in order to create the interspace forming the waterway Vn between two rows of photovoltaic panels R1, R2; R2, R3, (and more generally Rk, Rk+1), between two consecutive rows of polygonal patterns, each carrying a row of photovoltaic panels.

The rows R1, R2, and more generally Rk, may consist of rows of simple panels as illustrated in FIGS. 1 to 11, or rows of multiple, for example dual, panels, as illustrated in FIG. 12. Thus, in FIG. 1, each member of the row is a pair of photovoltaic panels, in particular "duo pitch", namely the two panels of the members have opposite inclinations.

Figure 6:
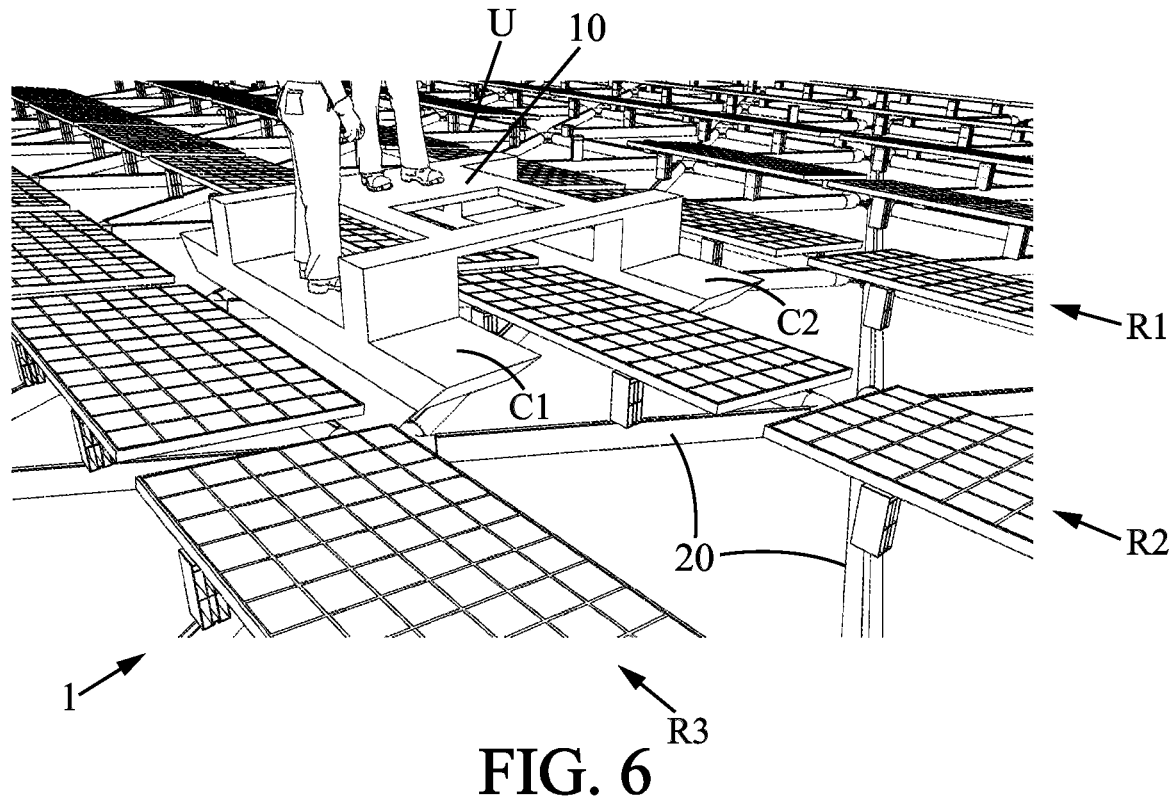
FIG. 6

According to one embodiment, the structure of the network results from the assembly of self-supporting floating support devices 4, each supporting a photovoltaic panel, in particular as illustrated in FIG. 1, and possibly each supporting a limited number of panels, such as two photovoltaic panels as illustrated in FIGS. 12*a* and 12 or each lozenge-shaped pattern carries a pair of panels (duo pitch), or three photovoltaic panels. Each support comprises said structural modules 2, each structural module 2 supporting said photovoltaic panel PV. Such an embodiment is illustrated for the floating plant of FIGS. 1 to 6 when the structure of the network is not completely immersed on place, but only by the push-down caused by the servicing unit as shown in FIG. 6, and also in FIG. 7, when the structure of the network is completely immersed on place.

Notice that the structural module 2 of each floating support device 4 extends beyond the photovoltaic panel PV, along the transverse direction T, so as to create the waterway Vn between the first row R1 of photovoltaic panels and the second row R2 of the photovoltaic panels.

Each floating support device 4 may consist (in terms of structure of the network), of a pattern of the lattice with a polygonal meshing, forming a polygon, in particular regular or irregular, such as a triangle in particular equilateral or isosceles (illustrated for example in FIG. 2), or a lozenge in FIG. 12*a*. Linking means 5 ensure fastening of the structural modules 2 of the floating support devices 4 to one another, in particular via their vertices.

According to one embodiment, the structural module 2 of the floating support device 4 includes tubes 20, respectively forming the sides of the polygon of the polygonal pattern, the tubes 20 being assembled together by fittings 21 are the vertices of the polygon.

The tubes may form one or several envelope(s) tightly enclosing air, or be filled with a material having a density lower than water. Sealing may be obtained by tight welding between the fittings and the tubes in particular in the case where the tubes are filled with air. In such a case, the tubular structural module 2 combines the floating module 3 function (and are therefore formed by the same elements), the structure of the network being above the water, not completely immersed on place, under the load of the photovoltaic panels, but immersed only temporarily under the vertical load of the maintenance unit.

Alternatively, and according to the embodiment shown in particular in FIG. 7, the tubular structural modules 2 do not ensure the floatability of the plant and are completely immersed on place under the load of the photovoltaic panels of the plant.

To this end, floating modules 3, positioned above the structural modules, secured to the structural modules 2, ensure the floatability of the plant while keeping the photovoltaic panels PV outside the water, while keeping the structure of the network completely immersed, namely the lattice of beams with a polygonal pattern.

The linking means 5 ensure fastening of the structural modules of the floating support devices to one another, and could enable a slight angular movement between the floating support devices, the structure of the network thus being deformable under the effect of swells.

Thus, the linking means 5 may include ears 50 protruding from the fittings 21, several ears 50 being set opposite one another and crossed by a locking member 51 to ensure fastening between said floating support devices 4.

When the structure of the network is above the water under the load of the photovoltaic panels, the ears 50 could be flexible, so as to obtain the local sinking of the structure under the load of the maintenance unit.

According to one embodiment, all or part of the locking members 51 crossing the ears 50 are secured to floating modules 3 positioned above the structure of the network formed by the assembly of structural modules 2. As learnt from WO2019053389 (A1) of the present Applicant, all or part of the floating modules 1 may, for example, be formed by plastic envelopes enclosing an air volume, having a neck 11 with an opening, sealed by a plug.

The ears 51 are then set opposite one another for the assembly of the structural modules 2 to one another. The floating modules 2 are configured so that the assembly of the ears set opposite one another is totally or partially obtained by the insertion of the neck (directed downward) throughout the ears while the plug is not in place, followed by locking of the assembly by placing the plug sealing the opening of the neck. Once the plug is locked, the ears are held between two stops formed by a shoulder at the base of the neck and a shoulder of the plug. The floating modules may be made of a plastic material by injection blow moulding or extrusion blow moulding.

The floating modules 3' may also be embedded with the structural modules 2', which might then be non-floatable, as shown as example in FIG. 8, or in FIG. 11. In such case, notice that the compressive/extension forces of the network, transit in the vertical plane of the structure of the network, yet without transiting in the floating modules 3'.

In FIG. 8, notice that the floating module 3' is embedded with a structural module 3 forming a beam of a pattern side, for example by overmoulding.

In FIG. 11, notice that the or each floating module 3' comprises cross-shaped grooves in over-depth of its upper wall, where the beams of the lattice extend longitudinally, so that a node of the lattice could be positioned at the intersection of the grooves.

Notice that the photovoltaic panels of the different rows of floats are secured to the floating modules, via vertical supports 6.

According to an embodiment of the present disclosure, it is possible to assemble the structural modules 2 of said floating support devices 4 and the photovoltaic panels PV together on the bank of the body of water, while pushing on the structure of the network supporting the photovoltaic panels progressively with the assembly thereof. According to one embodiment, such an assembly could be ensured without any lifting means for putting the floating solar plant in the water.

According to one embodiment, shown for example in FIG. 8, the polygonal pattern of the lattice is a polygon with N sides, for example a triangle in particular equilateral or isosceles. N structural modules 2' (for example three structural modules are assembled in the case of a triangle) are then assembled by their ends, while respectively forming the sides of the polygon of the lattice with a polygonal pattern. For example, the structural modules 2' are assembled via ears 50' at their ends, the ears 50' set opposite one another and crossed by locking members. In such an embodiment according to FIG. 8, each photovoltaic panel PV is supported by several distinct structural modules 2', rather than only one structural module 2 like in FIG. 1. The floating modules 3' may be subjected to all or part of the structural modules 2' in particular via supports as shown in FIG. 8. According to another possibility, the panels are secured to the floating modules 3'.

According to one embodiment, vertical supports 6 are subjected to the structural modules 2, 2' to ensure the vertical interlocking of the photovoltaic panels PV with respect to the horizontal plane forming the structure of the network.

For example, the structural modules 2, 2' and the vertical supports 6 may be assembled by a hooking rib 7/hooking groove pair. The hooking rib 7 (or hooking groove) may be borne by all or part of the tubes 20 of the structural modules, obtained in particular during the extrusion of the tube 20. All or part of the vertical supports 6 may consist of profiles, the hooking groove (or hooking rib) being obtained by extrusion of the profile.

According to one embodiment, illustrated as example in FIG. 9 or 10, the lattice forming the structure of the network, results from the assembly of structural modules in the form of long beams, at least partially, meaning that the long beam has a larger dimension than the polygonal pattern (in particular triangular). The structure of the structure of the network is then substantially rigid, still possibly could feature some flexibility of the beams adapted to enable a local sinking when the structure is immersed only under a vertical load, and could also require lifting means to put it in the water. In general, different orientations of the rows of panels R1, R2, R2 may be considered with regards to the patterns of the structure of the network, FIGS. 9 and 10 featuring two possible orientations as non-limiting examples, other than the orientation of the rows of panels illustrated in the previous figures.

According to the present disclosure, the structure of the network has a planar seat, said structure of the network being configured so as to be substantially planar when it rests on a planar surface.

Preferably, the structure of the network has a planar seat, which could bear:
 directly on the horizontal surface, like for example for the embodiments of FIGS. 1 to 7,
 indirectly on the horizontal surface, via the floating modules 3' like for example for the embodiments of FIGS. 8 and 11.

According to one embodiment, said floating solar plant comprises a third row R3 of photovoltaic panels, following the first and second rows of solar panels, and wherein each of the second row R2 of photovoltaic panels and the third row R3 of photovoltaic panels extends along the same longitudinal direction D and are spaced apart according to the transverse direction T, perpendicular to the longitudinal direction by the structural modules 2.

Said structural modules 2 ensure the spacing between the second row R2 of photovoltaic panels and the third row R3 of photovoltaic panels are configured so as to be immersed forming a waterway Vn along the longitudinal direction D between the second row R2 of photovoltaic panels and the third row R3 of photovoltaic panels enabling the circulation of a floating servicing unit U, the interlocked structural modules 2 extending substantially along the horizontal plane such that the compressive/tensile forces transit in the structure, while being contained in said horizontal plane of said structure of the network.

In general, the floating solar plant may comprise an integer number N of rows of photovoltaic panels larger than three, the panels of each row of photovoltaic panels extending along the longitudinal direction L, and being spaced apart along the transverse direction T by the structural modules forming the structure of the network which extends substantially along the horizontal plane. In general, waterways Vn are provide above the structural modules 2, 2' between the rows of photovoltaic panels of ranks k−1 and k with k being comprised between 2 and N and in order to ensure the maintenance of the panels of the different rows of ranks 1 to N.

According to one embodiment, the floating solar plant is equipped with a floating servicing unit U, configured so as to circulate along the waterway Vn between the first row R1 of photovoltaic panels and the second row R2 of photovoltaic panels, and possibly more generally between the rows of ranks k−1 and k when k is comprised between 2 and N.

According to one embodiment, the servicing unit U comprises a first hull C1 and a second hull C2 spaced apart from one another according to the spacing between the two waterways Vn respectively separating the first row R1 of photovoltaic panels and the second row R2 of photovoltaic panels on the one hand, and the second row R2 of photovoltaic panels and the third row R3 of photovoltaic panels, on the other hand.

The first hull C1 is configured so as to circulate in the waterway between the first row R1 of photovoltaic panels and the second row R2 of photovoltaic panels, the second hull C2 configured so as to circulate in the waterway between the second row R2 of photovoltaic panels and the third row R3 of photovoltaic panels.

A bridge 10, joins the first hull C1 and the second hull C2 to one another, and is configured so as to lie astride the photovoltaic panels PV of the second row R2 of photovoltaic panels when the servicing unit circulates according to the longitudinal direction L.

In general, the first hull C1 can circulate along the waterway between the row of rank k−1 and k, and the second hull can simultaneously circulate along the waterway between the row of photovoltaic panels of rank k and k+1 when k is comprised between 2 and N−1.

Notice that the bridge 10 may comprise a window F, providing access to the photovoltaic panel PV positioned beneath the bridge for the operator present over the bridge 10.

According to one embodiment, the floating unit is configured so as to circulate along the waterway above the structural modules 2; 2' interlocked between the first row R1 of photovoltaic panels and the second row R2 of photovoltaic panels, and possibly along the waterway above the structural modules 2; 2' interlocked between the second row R2 of photovoltaic panels and the third row R3 of photovoltaic panels, and possibly more generally between the rows of panels k and k+1 while causing the local sinking of the structure of the network, by bearing on said structural modules 2, 2'.

The present disclosure also relates to a method for manufacturing such a plant; wherein all or part of the floating modules 3, 3' and of the structural modules 2, 2' consist of metallic, plastic or composite elements obtained by moulding or extrusion, or still result from the assembly of metallic, composite or plastic elements obtained by moulding or extrusion.

In particular, the present invention relates to a method for manufacturing the structural modules of a plant with tubes 20 and fittings 21 wherein the structural modules 2 forming polygonal patterns of the lattice with a polygonal meshing of the structure of the network are obtained by assembling the plastic tubes 20, with a length corresponding to the sides of the polygonal pattern of the lattice with a polygonal meshing, the tubes being set end-to-end by the tubular plastic fittings 21 at the vertices of the polygonal patterns and assembled by tight welding between inner/outer bearing surfaces of the fittings 21 and outer/inner bearing surfaces of the tubes 20 to form the structural modules.

Advantageously, the weld may consist of an induction weld obtained by subjecting a metallised ring Bm, provided as an intermediary between an inner/outer bearing surface of the fitting 21 and an outer/inner bearing surface of the tube 20 to an electromagnetic radiation.

Figure 14:
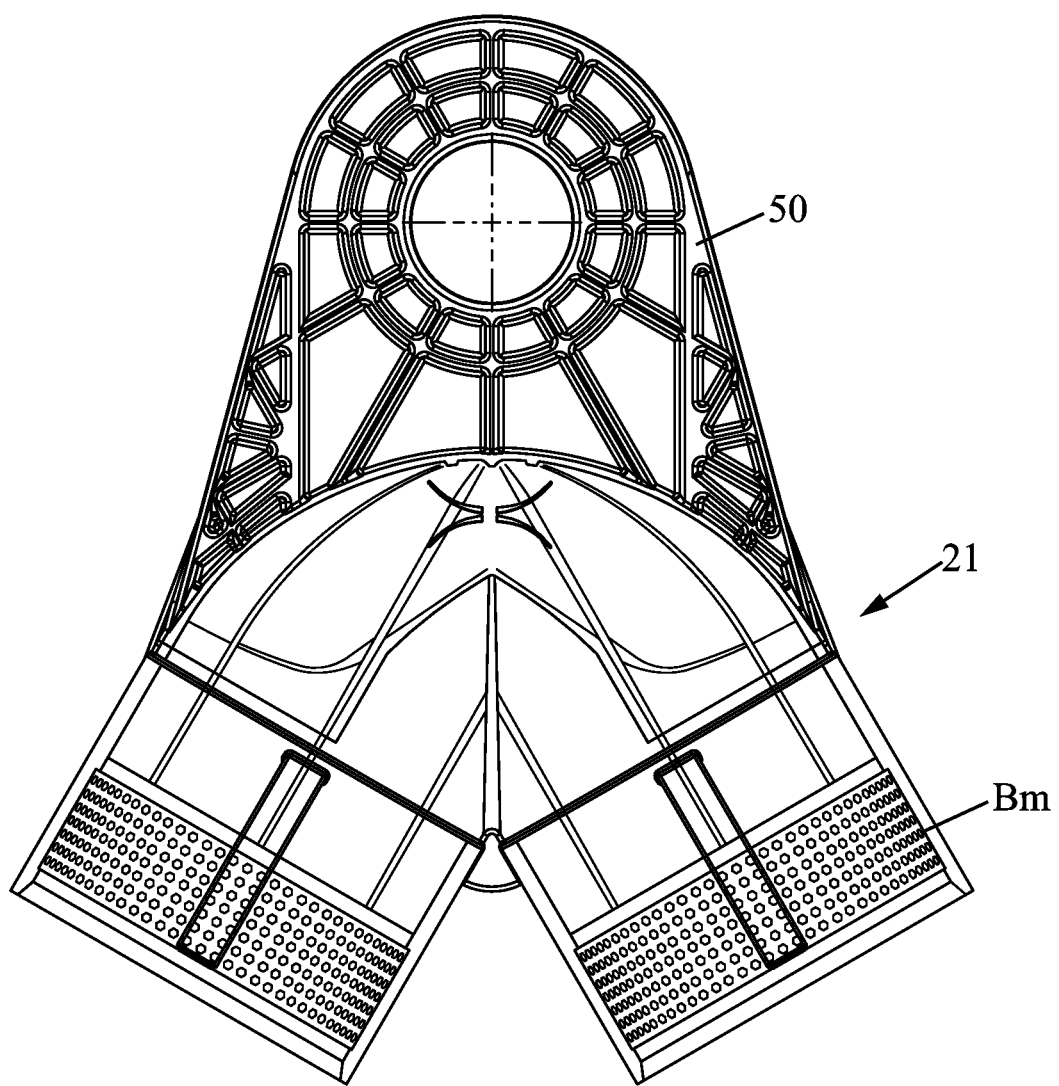
FIG. 14

As example, FIG. 14 discloses a sectional view of such a fitting 21. In general, it may consist of a fitting including a tubular body forming a deflection, for example by 60° in FIG. 14 with at least two inner (or outer) bearing surfaces. The tubes, for example cylindrical, have outer (or inner) bearing surfaces which are nested within the bearing surfaces of the tubular body.

In FIG. 14, notice the presence of two metallised rings Bm which may be overmoulded as an insert into the body of the deflection, in particular during the injection moulding of the fitting 21, and for example overmoulded over the two inner bearing surfaces of the fitting. These rings Bm are aperture/perforated, and enable the implementation of the induction welding.

To do so, the tube 20 is nested within the fitting 21, with an overlapping of the inner bearing surface and of the outer bearing surface (tubular) of the fitting 21 and of the tube 20, the metallised ring Bm is then positioned as an intermediary between the inner/outer bearing surfaces, and then the assembly is subjected to an electromagnetic field causing heating of the metallised ring to a temperature equal to or higher than the melting point of the plastic. A tight weld is obtained between the inner bearing surface and the outer bearing surface over the entire periphery of the tube with a melting of the plastic throughout the perforations of the metallised ring Bm.

Advantageously, this manufacturing method may be implemented in the proximity of the installation site of the floating solar plant, as it requires little equipment for the implementation thereof. Advantageously, this allows transporting the components of the plant as a kit essentially comprising in the disassembled state, tubes (in particular with hooking rib/groove), fittings 21, and vertical supports 6, which could be easily moved, transported and stored, thanks to their small bulk.

For example, when the structural module consists of a polygonal pattern in the form of a polygon in particular an equilateral triangle, all fittings 21 may be identical with a 60° deflection and the tubes 20 also identical, and in particular with the same length, which is quite advantageous.

The present disclosure also relates to a method for assembling such a plant, wherein the structural modules 2 obtained by the manufacturing method are assembled by setting ears 50 protruding from the fittings 21 opposite one another, several ears 50 being set opposite one another and crossed by locking modules 51 of the structural modules at the vertices of the polygonal patterns of the lattice of the structure of the network.

The present disclosure also relates to a method for assembling a plant according to the present disclosure, wherein the structural modules 2; 2', and possibly the floating modules 3; 3' and the photovoltaic panels PV are assembled together on the bank of the body of water, while pushing the structure of the network supporting the photovoltaic panels progressively with the assembly thereof.

The present disclosure also relates to a method for maintaining a plant according to the present disclosure, wherein the maintenance of the plant is ensured thanks to the servicing unit U circulating in the waterway(s) between the photovoltaic panels PV.

Advantages

The plant according to the present disclosure is advantageous in comparison with those learnt from the document WO201213998 (A2) or from the document WO 2015092237(A1) wherein the implementation of maintenance requires the floatability of the plant to take into account the added load of one or several operator(s) performing the maintenance: The structure of the network of the plant according to the present disclosure has a lighter design and requires less material, in particular plastic material, for the implementation thereof.

The plant according to the present disclosure is also advantageous in comparison with the teaching of the document US2017/0033732A1 as it is possible, at least according to one embodiment, to easily and rapidly assemble said plant from the bank, and for example, as example without requiring lifting means for putting it in the water.

Unlike the document US2017/0033732A1, or WO 2014/136106, the plant of the present disclosure does not require laying a network of tensioned cables, substantially horizontally, for the implementation thereof as the lattice of beams forming the structure of the plant according to the present disclosure could work in compression, unlike the cable structure of these anteriorities.

The structure of the lattice of beams of the plant according to the present disclosure extends substantially according to a horizontal plane, the forces being contained in this horizontal plane: hence, it does not require any U connections, unlike the documents US2018/0001975 A1 or WO 2014/136106 which need these U connections to ensure the creation of the waterways while ensuring a change in the plane of the forces transiting in the structure, at each waterway.

The plant according to the present disclosure is also advantageous in comparison with the teaching of the document US2018/0001975 A1 as the structure of the network has a planar seat allowing pushing the structure of the network supporting the photovoltaic panels in particular formed by floating support devices, progressively with the assembly thereof on the bank or shore, by slipping the structure of the network, and possibly the floating support devices of the plant, and unlike the structure of the network formed by the document US2018/0001975, which has U connections protruding under the surface of the floats of the floating support devices of the panels, these protruding connections preventing the floating support devices from resting on the ground, while generating considerable frictions incompatible with such a way for putting it in the water.

According to an advantageous embodiment, the floating solar plant may be easily and rapidly obtained by a kit comprising three types of components, namely fittings 21, tubes 20, and vertical supports 60 in the disassembled state, which has a particularly small bulk and facilitates storage and transport.

The invention claimed is:

1. A floating solar plant supporting photovoltaic panels, resulting from the assembly of structural modules and floating modules on a body of water, forming a floating network supporting photovoltaic panels, comprising:
   a first row of photovoltaic panels,
   a second row of photovoltaic panels, and
   wherein the first row of photovoltaic panels and the second row of photovoltaic panels extend along the same longitudinal direction and are spaced apart according to the transverse direction, perpendicular to the longitudinal direction, and wherein at least said structural modules ensuring spacing between the first row of photovoltaic panels and the second row of photovoltaic panels are configured so as to be immersed, enabling the circulation of a floating servicing unit along a waterway above said structural modules,
   said structure of the network, comprising an assembly of said structural modules, rigid or semi-rigid, being configured so as to work along the two directions substantially of the horizontal plane of the structure while resisting the compressive forces and the tensile forces to which said structure of the network is subjected,
   wherein, the structure of the network extends substantially along the horizontal plane, the structure being formed by said assembly of the structural modules forming a lattice of beams with a polygonal meshing, extending along the horizontal plane, the beams of the lattice replicating the polygonal pattern of the meshing, featuring apertures configured to cool down the photovoltaic panels located above the structure of the network, the lattice of beams forming the structure being configured so as to be immersed on place, or alternatively immersed at least locally under the vertical load of the servicing unit and wherein vertical supports are subjected to the structural modules in particular to the beams, and possibly to the floating modules, to ensure the vertical interlocking of the photovoltaic panels with respect to the horizontal plane forming the structure of the network while ensuring keeping of the photovoltaic panels out of water, the structure formed by the lattice of beams with a polygonal meshing being configured such that the compressive/tensile forces transit in the structural modules, while being contained in said horizontal plane of said structure of the network, and wherein the structure of the network has a planar seat, said structure of the network being configured so as to be substantially planar when it rests on a planar surface.

2. The floating solar plant according to claim 1, wherein the lattice has a triangular, hexagonal, or lozenge-shaped meshing.

3. The floating solar plant according to claim 1, wherein the floatability of the solar plant is configured so that the structure of the network formed by the lattice of beams with a polygonal meshing extending along the horizontal plane is completely immersed on place with the presence of a water height above the structural modules so as to form a waterway between the first row of photovoltaic panels and the second row of photovoltaic panels, extending along the longitudinal direction, the photovoltaic panels of the plant being kept out of water by the vertical supports, and wherein the structural modules forming the lattice of beams with a polygonal meshing extending along the horizontal plane are arranged below the floating modules, in order to keep the structure of network completely immersed on place.

4. The floating solar plant according to claim 1, wherein the floatability of the plant is configured such that:

the structure of the network formed by the lattice of beams with a polygonal meshing extending along the horizontal plane is above the water when the structure of the network is not subjected to any substantial vertical load other than that of the photovoltaic panels, said structural modules are immersed, at least locally, under the vertical load of a servicing unit vertically bearing on the structure of the network, the photovoltaic panels of the plant being kept out of water by the vertical supports upon a local sinking by the servicing unit, wherein the floatability of the plant is insufficient for an operator, whether a man or a women, weighting between 60 kg and 150 kg could walk on the beams of the structure of the lattice without having his/her feet in the water because of the local sinking of the structure.

5. The floating solar plant according to claim 1, wherein the structure of the network results from the assembly of self-supporting floating support devices, each or at least most of them supporting a photovoltaic panel, and possibly several panels such as two panels or three photovoltaic panels, said floating support devices comprising said structural modules, each structural module of the floating support devices supporting the photovoltaic panel, and possibly said several photovoltaic panels, and wherein the structural module of each floating support device extends beyond the photovoltaic panel, along the transverse direction, so as to create the waterway between the first row of photovoltaic panels and the second row of the photovoltaic panels.

6. The floating solar plant according to claim 5, wherein the structural module of each floating support device consists of a pattern of the lattice with a polygonal meshing, forming a polygon, linking means ensuring fastening of the structural modules and of the floating support devices to one another, and wherein the structural module includes tubes, respectively forming the sides of the polygon of the polygonal pattern, the tubes being assembled together by fittings at the vertices of the polygon.

7. The floating solar plant according to claim 6, wherein the tubes form several envelopes tightly enclosing air, or are filled with a material having a density lower than water, and wherein sealing being obtained by tight welding between the fittings and the tubes.

8. The floating solar plant according to claim 4, wherein the linking means ensuring fastening of the structural modules of the devices to one another including ears protruding from the fittings, several ears being set opposite one another and crossed by a locking member to ensure fastening between said floating support devices, and wherein the structure of the network being above the water, not completely immersed on place, under the load of the photovoltaic panels, configured so as to be immersed temporarily, and locally under the vertical load of the servicing unit, by deformation of the flexible ears.

9. The floating solar plant according to claim 6, wherein the pattern of the lattice with a polygonal meshing forming the structural module of each floating device is a triangle, in particular an isosceles or equilateral triangle, for example adapted for supporting a photovoltaic panel, or a lozenge for example adapted for supporting two photovoltaic panels, having in particular opposite inclinations.

10. The floating solar plant according to claim 1, wherein the polygonal pattern of the lattice is a polygon with N sides, N structural modules being assembled by their ends respectively forming the sides of the polygon of the lattice with a polygonal pattern.

11. The floating solar plant according to claim 10, wherein the floating modules are subjected to all or part of the structural modules.

12. The floating solar plant according to claim 1, wherein the structure of the network resulting from the assembly of the structural modules is non-floating as such, the floatability of the plant ensured by said floating modules provided as elements distinct from the structural modules, and wherein the photovoltaic panels at least of the first row of photovoltaic panels and/or of the second row of panels are secured to the floating modules via vertical supports.

13. The floating solar plant according to claim 1, wherein the beams of the lattice consist of tubes whose length corresponds to the sides of the polygonal pattern of the lattice and assembled together by fittings at the vertices of the polygonal pattern, and wherein the floating modules are formed by the tubes of the structural modules which form tight envelopes tightly enclosing air, possibly with their fitting or are filled with a material having a density lower than water.

14. The floating solar plant according to claim 1, equipped with a floating servicing unit, configured so as to circulate along the waterway between the first row of photovoltaic panels and the second row of photovoltaic panels.

15. The floating solar plant according to claim 14, comprising a third row of photovoltaic panels, following the first and second rows of photovoltaic panels, and wherein each of the second row of photovoltaic panels and the third row of photovoltaic panels extends along the same longitudinal direction and are spaced apart according to the transverse direction, perpendicular to the longitudinal direction by the structural modules and wherein said structural modules ensuring spacing between the second row of photovoltaic panels and the third row of photovoltaic panels are configured so as to be immersed forming a waterway along the longitudinal direction between the second row of photovoltaic panels and the third row of photovoltaic panels enabling the circulation of a floating servicing unit, the structural modules extending substantially along the horizontal plane such that the compressive/tensile forces transit in the structure, while being contained in said horizontal plane of said structure of the network and wherein the servicing unit comprises:

a first hull and a second hull spaced apart according to the spacing between the two waterways respectively separating the first row of photovoltaic panels and the second row of photovoltaic panels on the one hand, and the second row of photovoltaic panels and the third row of photovoltaic panels, on the other hand, the first hull being configured so as to circulate in the waterway between the first row of photovoltaic panels and the second row of photovoltaic panels, the second hull configured so as to circulate in the waterway between the second row of photovoltaic panels and the third row of photovoltaic panels, a bridge, joining the first hull and the second hull to one another, and configured so as to lie astride the photovoltaic panels of the second row of photovoltaic panels when the servicing unit circulates according to the longitudinal direction.

16. The floating solar plant according to claim 14, wherein the floating unit is configured so as to circulate along the waterway above the structural modules interlocked between the first row of photovoltaic panels and the second row of photovoltaic panels, and possibly along the waterway above the structural modules interlocked between the second row of photovoltaic panels and the third row of photovoltaic panels, while causing the local sinking of the structure of the network, by bearing on said structural modules.

17. A method for manufacturing the structural modules of the plant according to claim 13, wherein the structural modules forming polygonal patterns of the lattice with a polygonal meshing of the structure of the network are obtained by assembling the plastic tubes, with a length corresponding to the sides of the polygonal pattern of the lattice with a polygonal meshing, the tubes being set end-to-end by plastic tubular fittings at the vertices of the polygonal patterns and assembled by tight welding between inner/outer bearing surfaces of the fittings and outer/inner bearing surfaces of the tubes to form the structural modules.

18. A method for assembling the plant according to claim 13, wherein the structural modules are assembled by setting ears protruding from the fittings opposite one another, several ears being set opposite one another and crossed by a locking member of the structural modules at the vertices of the polygonal patterns of the lattice of the structure of the network.

19. A method for maintaining a plant according to claim 14, wherein the maintenance of the plant is ensured thanks to the servicing unit circulating in the waterway(s) between the photovoltaic panels.

\* \* \* \* \*